United States Patent [19]

Cumpston

[11] 4,303,802
[45] Dec. 1, 1981

[54] MONITORING SYSTEM USING TELEPHONE CIRCUIT

[75] Inventor: Edward H. Cumpston, Bennington, Vt.

[73] Assignee: Venmark Corporation, Bennington, Vt.

[21] Appl. No.: 179,297

[22] Filed: Aug. 19, 1980

Related U.S. Application Data

[63] Continuation-in-part of Ser. No. 45,138, Jun. 4, 1979, abandoned.

[51] Int. Cl.$^3$ .................................... H04M 11/04
[52] U.S. Cl. .................... 179/2 A; 179/5 R; 179/1 MN
[58] Field of Search ............... 179/2 A, 2 AM, 2 AS, 179/5 R, 5 P, 1 MN, 84 R; 340/502, 505

[56] References Cited

U.S. PATENT DOCUMENTS

| | | | |
|---|---|---|---|
| 3,360,777 | 12/1967 | Kolm | 179/2 A |
| 3,612,768 | 10/1971 | Sherman | 179/5 R |
| 3,723,656 | 3/1973 | Curtis et al. | 179/2 A |
| 3,787,624 | 1/1974 | Spitalny et al. | 179/2 A |
| 3,794,764 | 2/1974 | Todd | 179/5 P |
| 3,809,813 | 5/1974 | Brown | 179/5 R |
| 3,876,836 | 4/1975 | Langan | 179/2 A |
| 4,085,292 | 4/1978 | Leslar et al. | 179/2 A |
| 4,250,352 | 2/1981 | Workman, Sr. | 179/5 R |

FOREIGN PATENT DOCUMENTS

| | | | |
|---|---|---|---|
| 1257870 | 1/1968 | Fed. Rep. of Germany | 179/5 R |
| 2373109 | 8/1978 | Fed. Rep. of Germany | 179/2 A |

Primary Examiner—Gerald L. Brigance
Attorney, Agent, or Firm—Stonebraker, Shepard & Stephens

[57] ABSTRACT

The inventive monitor system uses a monitor circuit 15, 25, 45 connected to a telephone circuit 10 and containing an electric switch 20 that changes state in response to change in a monitored condition. A capacitor 16 and high pass filter effectively isolate the monitor circuit from the phone circuit so as not to interfere with use of the phone circuit, and the monitor circuit is energized by a small portion of an ac ringing signal in the telephone circuit. The monitor circuit interrupts ringing of the phone circuit by briefly interacting with the phone circuit to electrically simulate answering the phone circuit. The number of rings before interruption conveys information about the state of the switch and the monitored condition when the phone is rung. The ringing interruption can occur after different intervals to indicate different circumstances, and several switches 20a and 20b can be used for monitoring several conditions.

9 Claims, 4 Drawing Figures

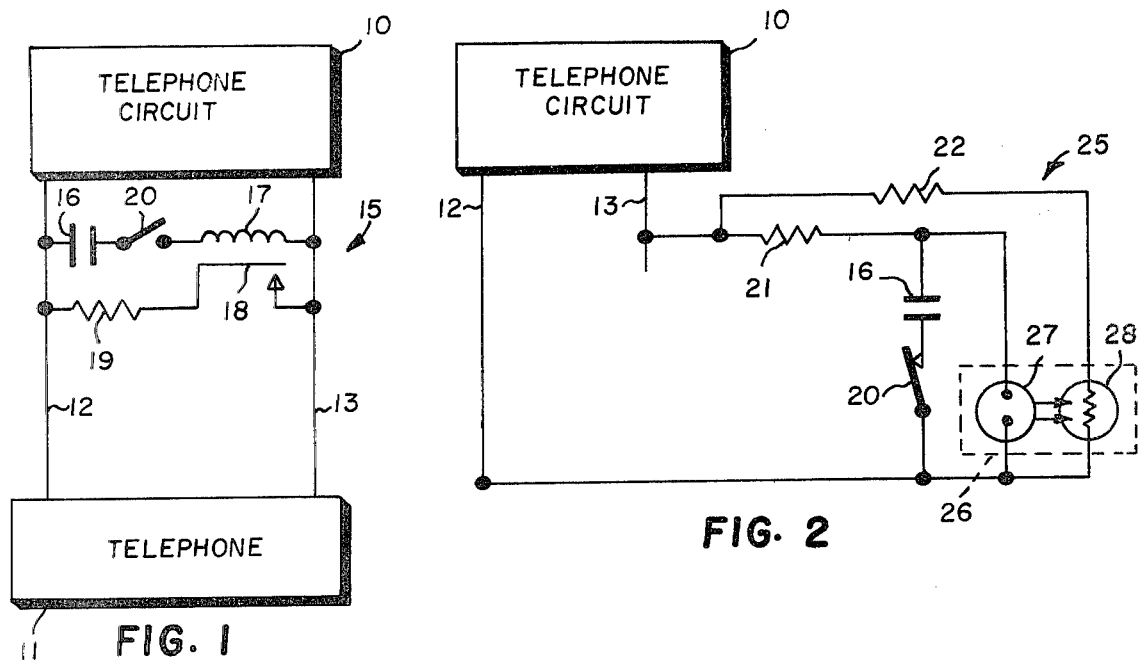
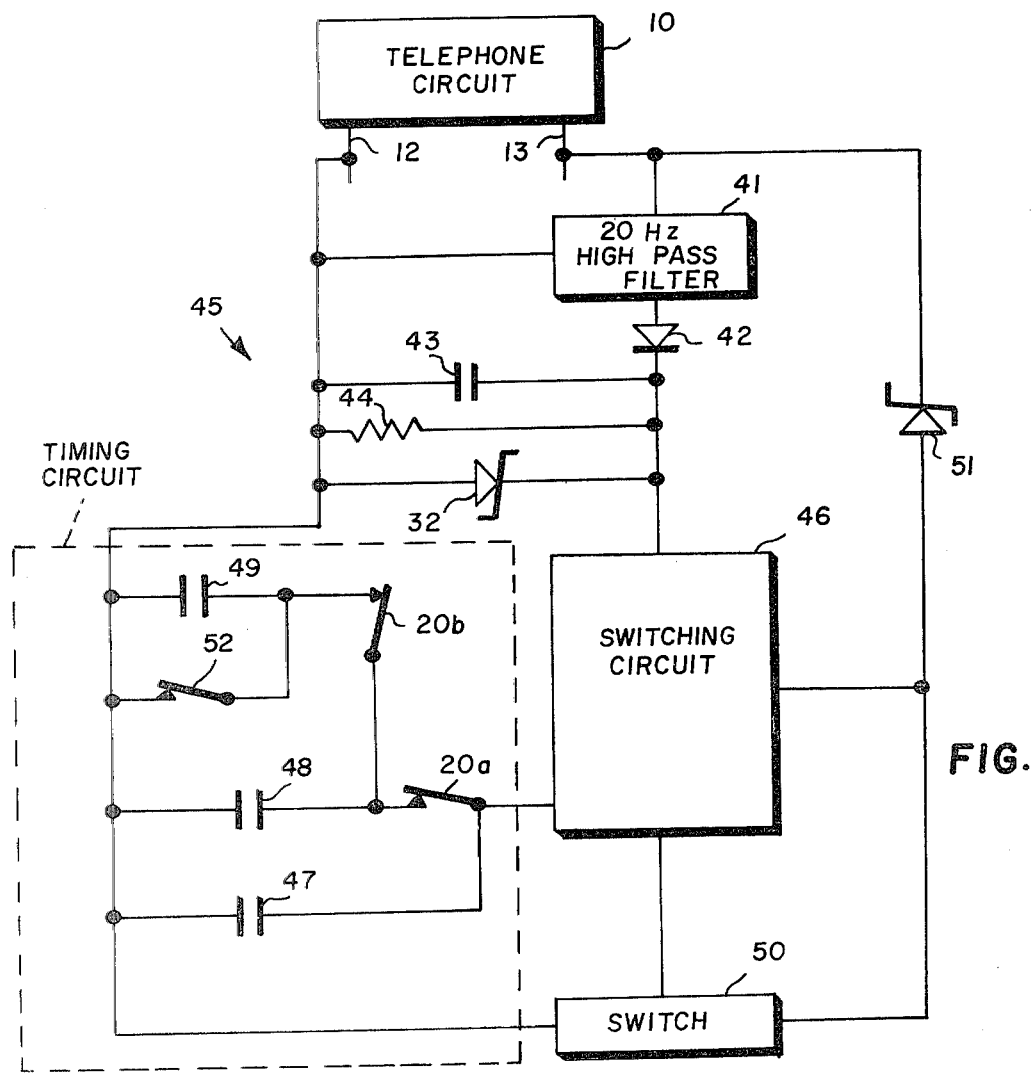

MONITORING SYSTEM USING TELEPHONE CIRCUIT

RELATED APPLICATIONS

This application is a continuation-in-part of my parent application Ser. No. 45,138, filed June 4, 1979, entitled MONITORING SYSTEM USING TELEPHONE CIRCUIT, and abandoned upon the filing of this CIP application.

BACKGROUND OF THE INVENTION

This invention relates to monitor systems that monitor a condition in the vicinity of a telephone circuit and indicate the state of the monitored condition when the phone circuit is called. An existing device of this type shorts out and disables the telephone circuit if the monitored condition is abnormal, and this interferes objectionably and illegally with the telephone circuit.

The invention recognizes the need for a better monitoring system that does not interfere with the telephone circuit and yet indicates the state of a monitored condition when the telephone circuit is called. The invention also recognizes a simple and effective way of accomplishing this with a device that is highly reliable, does not require a power source, is simple to install, does not interfere with the telephone circuit, and can respond in several ways to convey information about monitored conditions when the phone circuit is called. It also does not require answering the telephone circuit or sending messages over the telephone circuit; and it accomplishes its objectives economically, conveniently, and reliably.

SUMMARY OF THE INVENTION

The inventive monitor system uses a monitor circuit connected to a telephone circuit and containing an electric switch that changes state in response to change in a monitored condition. The monitor circuit is effectively isolated from the phone circuit so as not to interfere with use of the phone circuit, and the monitor circuit is energized by a small portion of an ac ringing signal in the phone circuit. The monitor circuit interrupts ringing of the phone circuit by briefly interacting with the phone circuit to electrically simulate answering the phone circuit. Interruption of the ringing occurs after a ringing interval as a function of the state of the switch when the telephone circuit is rung so that the number of rings before the interruption informs the caller about the monitored condition. The ringing interruption can occur after different intervals to indicate different circumstances, and several switches can be used for monitoring several conditions.

DRAWINGS

FIG. 1 is a schematic circuit diagram of a simple preferred embodiment of the invention;

FIG. 2 is a schematic circuit diagram of another simple preferred embodiment of the invention using a normally closed monitor switch;

FIG. 3 is a schematic circuit diagram of another preferred embodiment of the invention having more than one monitor switch and a capacity to indicate different circumstances.

DETAILED DESCRIPTION

Figure 4:
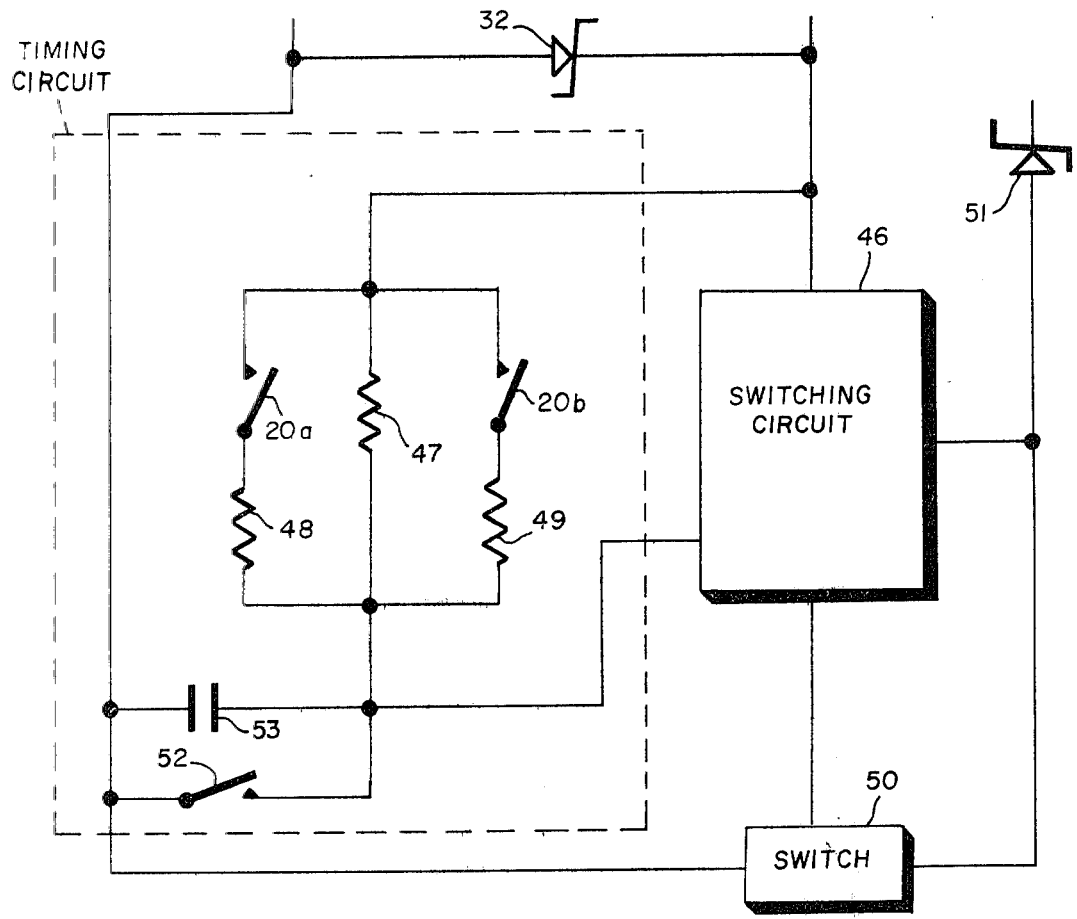
FIG. 4 is a schematic circuit diagram of a preferred alternative for the timing circuit of FIG. 3.

The invention recognizes that ringing of a telephone circuit can be interrupted after a ringing interval to produce information without sending signals through the telephone circuit or interfering with its operation. This leads to a passive monitor system that can convey information about the state of a monitored condition when a telephone circuit is rung by calling the circuit's number. The ringing of the phone circuit can be interrupted by a brief interaction with the monitor circuit that simulates answering the phone circuit, and the time when the ringing is interrupted can be a function of a switch state to convey a message about monitored conditions or circumstances in the vicinity of a telephone. This leads to possibilities for monitoring any condition or circumstance that can be made to open or close an electric switch; and it allows the state of these conditions to be checked from any remote location, simply by ringing the monitored phone circuit. The invention applies these discoveries to several simple and reliable monitor systems having different capacities and features as explained below.

A simple illustration of the basic concept used in the invention is shown in FIG. 1 as applied to a telephone circuit 10 communicating with a telephone 11. A monitor circuit 15 is connected between telephone lines 12 and 13 as illustrated and is effectively isolated from phone circuit 10 so as not to interfere with use of phone circuit 10. The isolation includes capacitor 16 that blocks dc signals so monitor circuit 15 does not interfere with voice or sound signals in phone circuit 10. A high pass 20 Hz filter formed as a resonant switch 18 as explained below cooperates with capacitor 16 to pass only ac ringing signals that energize monitor circuit 15. Dialing spikes, noise, and any other ac signals in phone circuit 10 are blocked from monitor circuit 15, which responds only to ringing during an abnormal monitored condition and generally does not interfere with any normal use of phone circuit 10.

A monitor switch 20 changes from a normal state (open) to an abnormal state (closed) in response to change in a monitored condition, which can be a great variety of events. Sufficiently high temperature within a building in the winter time is a likely condition for switch 20 to monitor as an indication that the furnace or heating system of the building is operating. Other possibilities include electric power on or off; burglar alarm tripped; freezer or refrigerator operating; water level in a sump; operation of appliances; overheating of a furnace; tripping of a safety device; and many others.

Switch 20 closes when an abnormal or trouble state occurs in the monitored condition, and this completes an electrical path between phone lines 12 and 13 through capacitor 16 and coil 17 that is part of a resonant vibrating reed switch 18 tuned to the 20 Hz ringing frequency of telephone circuits. Then if ringing occurs in telephone circuit 10 when trouble switch 20 is closed, switch 18 vibrates and engages its contact to place resistor 19 between telephone lines 12 and 13. This briefly interacts with telephone lines 12 and 13 to electrically simulate answering of telephone 11 and stops the ringing of telephone circuit 10. The interruption of the ringing indicates that an abnormal trouble condition exists.

Monitor circuit 15 can be simply connected across telephone lines 12 and 13 at a baseboard terminal where telephone 11 is connected to telephone circuit 10, without invading telephone 11 or interfering with telephone circuit 10. Since capacitor 16 and switch 18 isolate monitor circuit 15 from everything but ringing signals on telephone circuit 10, presence of monitor circuit 15 is undetectable and does not interfere with use of telephone circuit 10. Resonator coil 17 for reed switch 18 has a high impedance of, for example, 50,000 ohms so that switch 18 responds only to high voltage ringing signals on telephone circuit 10. In effect, resonator switch 18 with its coil 17 is tuned to the 20 Hz frequency of a telephone ringing signal and acts as a high pass filter responding only to a ringing signal and not to noise, dialing spikes caused by an outgoing call, or other signals in circuit 10. Resistor 19 is preferably about 100 ohms and simulates the resistance of telephone 11 when answered to produce a brief electric signal across lines 12 and 13 making phone circuit 10 respond as if telephone 11 had been answered. This interrupts the ringing signal and thereby produces information about the condition monitored by switch 20.

There are advantages in having monitor switch 20 closed in a normal state and open in an abnormal state. This will interrupt ringing and indicate trouble if the monitor circuit is open from disablement or tampering, as well as an abnormal monitored state.

A simple monitor system illustrating one possibility for using a normally closed trouble switch 20 is shown in FIG. 2. The monitor circuit 25 of FIG. 2 uses an opto-isolator device 26 that includes a neon lamp 27 and a photoresistor 28. Resistor 21 limits current to lamp 27, and resistor 22 limits current through photoresistor 28. Capacitor 16 isolates switch 20 of the monitor circuit 25 from dc signals on phone lines 12 and 13, which are also blocked by the resistance of lamp 27 and photoresistor 28. A slight delay in the response of photoresistor 28 to light from lamp 27 makes monitor circuit 25 unresponsive to brief ac dialing spikes or noise.

With switch 20 normally closed indicating absence of trouble, ringing signals in telephone circuit 10 are shunted through resistor 21, capacitor 16, and switch 20 with no practical effect on telephone circuit 10. Because of capacitor 16, dc signals in lines 12 and 13 are never shunted; and the load represented by resistor 21 is less than an extension phone, so that monitor circuit 25 does not interfere with use of phone circuit 10.

If trouble switch 20 is open, indicating abnormal conditions or possibly disconnection or tampering, a ringing signal makes lamp 27 glow illuminating photoresistor 28 to apply a brief electric signal across lines 12 and 13. This simulates answering of a telephone and interrupts the ringing to convey a message warning of trouble. Even with switch 20 open, dialing spikes and noise in circuit 10 are too brief to make photoresistor 28 respond; but a ringing signal does, so that photoresistor 28 serves as a ringing signal high pass filter.

It is preferred according to the invention to interrupt ringing after one ringing interval to indicate trouble and after another ringing interval to indicate no trouble, thus conveying more information. A caller then learns that the phone circuit and the monitoring circuit are both operating and that a call has reached a monitored destination, and the clear distinction between early and late interruption of the ringing unambiguously answers the question of whether monitor switch 20 is open or closed. This makes it convenient for a service vendor to call the monitored telephones of customers who are away from their buildings, determine the monitored state, and know reliably whether a service call is necessary.

Monitor circuit 45 of FIG. 3 not only accomplishes this, but also uses two trouble switches and a manually operable "at home" switch for an even more varied response to monitored circumstances. A 20 Hz high pass filter 41 passes only a 20 Hz telephone ringing signal. It can use a resonant switch such as previously explained or a delay circuit slow enough so it does not respond to dialing voltage spikes or circuit noise signals on telephones lines 12 and 13. Various resonant circuits and delay circuits can accomplish the desired filtration and reliably allow only a 20 Hz ringing signal to actuate monitor cicuit 45. Diode 42 passes only a rectified dc voltage to charge capacitor 43 with a portion of a ringing signal, and zener diode 32 supplies a steady low dc voltage from capacitor 43 to operate switching circuit 46 and its associated timing circuit. Resistor 44 slowly discharges capacitor 43 to insure that monitor circuit 45 operates only during ringing of a phone circuit.

Switching circuit 46 is a well known type of microprocessor that provides a switching signal when it receives a certain voltage. This voltage is provided by charges accumulated on timing capacitors 47, 48, and 49; and the switching signal actuates a switch 50 that briefly connects a resistor to phone lines 12 and 13 via zener diode 51 for simulating answering of a telephone to interrupt the ringing signal. Zener diode 51 also provides dc isolation of monitor circuit 45 from phone circuit 10 and responds only when a ringing signal is occurring to insure that a change of state of switch 50 is effective in interrupting ringing.

In the embodiment of FIG. 3, trouble switch 20a is a normally closed burglar alarm switch that opens if a burglar alarm is activated. With trouble switch 20a open, capacitors 48 and 49 are disconnected from switching circuit 46 so that ringing interruption occurs after a brief interval of, for example, six seconds required to charge timing capacitor 47. This can prevent sending a serviceman to a house where a burglar may be at work, and it also establishes that the phone circuit and monitor circuit 45 are operating. Furthermore, the phone circuit can be used for calls, if necessary.

If trouble switch 20a is closed (indicating that the burglar alarm has not been tripped) but trouble switch 20b is open (indicating low temperature from furnace failure), capacitor 49 is disconnected from switching circuit 46; and ringing is interrupted after a longer interval of, for example, 12 seconds required to charge capacitors 47 and 48. This condition calls for dispatching a furnace repairman and also indicates clearly that the telephone and monitor circuit 45 are operating.

If both trouble switches 20a and 20b are closed, indicating no problems, ringing is interrupted after the longest interval of, for example, 24 seconds required to charge all three capacitors 47, 48, and 49. This is valuable to confirm that a phone circuit monitored by circuit 45 has been called and that trouble switches indicate no problem, to distinguish from a wrong number or a possibly disabled phone that could ring indefinitely.

Another feature of the circuit of FIG. 3 is "at home" switch 52 that is manually operated. When switch 52 is closed and trouble switches 20a and 20b are also closed, as is the normal condition when a person is at home, timing capacitors 47, 48, and 49 are short-circuited and ringing is never interrupted. This eliminates the 24 second interruption of ringing that would normally occur when the phone circuit is called and the trouble switches are closed. This allows plenty of time to answer the phone without any interruption of ringing that might induce callers to hang up when ringing stopped.

Because a person might easily leave home forgetting to open switch 52, its arrangement as shown in FIG. 3 does not disable the trouble switches. Opening of either trouble switch 20a or 20b interrupts ringing respectively in 6 seconds or 12 seconds to indicate the nature of the problem, even if switch 52 is left closed. The only disablement from this is that ringing will not interrupt after 24 seconds.

The Federal Communications Commission presently requires that passive telephone monitoring systems be arranged so as not to produce information without a simulated answering of the telephone circuit triggering the equipment for automatically billing phone calls. Without this feature, and with a system arranged for the earliest interruption of the ringing to indicate an abnormal condition, it would be possible for a caller to count rings beyond the earliest interruption to realize that conditions are normal and then hang up without being charged for the call.

The remedy for this is a change in the timing circuit of monitor 45 as shown in FIG. 4. This circuit makes the first ringing interruption a normal signal meaning that the monitor circuit is operating and conditions are not abnormal. Later interruptions of ringing can indicate different sorts of trouble. A circuit with the first interruption of ringing indicating normal conditions as suggested in FIG. 4 has been approved by the FCC.

In the timing circuit of FIG. 4, a single capacitor 53 is charged via resistors 47-49 depending on the state of burglar switch 20a and temperature switch 20b that are both closed under normal circumstances. Capacitor 53 is shunted by the "at home" switch 52 so that ringing will not be interrupted when switch 52 is closed.

With switches 20a and 20b both closed under normal circumstances, capacitor 53 charges via all three resistors 47-49 and reaches the switching voltage in the shortest possible time to interrupt ringing after about five rings to indicate normal conditions. This also completes a phone call for billing purposes.

If burglar switch 20a is tripped open, this removes resistor 48 from the circuit and requires a longer time for charging capacitor 53 via resistors 47 and 49 so that about eight rings elapse before an interruption indicating the open state of burglar switch 20a. If switch 20a is closed but switch 20b is open because of low temperature, this removes resistor 49 from the circuit and increases the time for charging capacitor 53 via resistors 47 and 48 so that about 11 rings elapse before an interruption indicating furnace failure.

The arrangement of FIG. 4 thus actuates phone company billing equipment for a completed call before transmitting any information and simulates answering the phone for every call except during a catastrophic failure such as cut or broken phone wires.

The inventive monitor system does not require a separate power supply and cannot be disabled by dead batteries or disconnection from electric power. It is also quite reliable in providing an indication of whether it and the telephone circuit to which it is connected are operating.

Its preferred use of normally closed switches produces a warning indicating trouble if the monitored circuits are disabled or disconnected, so that it is at least partially tamper-proof. It is also versatile because it can be applied to many conditions that might be important to monitor in a building; and by interrupting telephone ringing after different intervals of time, it can convey messages relative to several monitored conditions. Unlike active alarms that produce signals or warnings when no help may be available, the inventive system responds only on request made by ringing a telephone circuit, and this can be done at a time when the necessary service is available. It does not interfere with telephone operation and is normally undetectable by the telephone company. It is also economically made and easy to install.

Service organizations such as fuel dealers, furnace or appliance repairmen, and others can use automatic telephone dialing equipment to call the phones of customers who are away from their buildings to check on monitored conditions and make any necessary repairs. This can save a great deal of time and expense over sending someone out to visit each home. A home or building owner can also call from a distance and get information on monitored conditions.

I claim:
1. A monitor system comprising:
   a. an electric switch that changes state in response to change in a monitored condition;
   b. a monitor circuit containing said switch and connected to a telephone circuit;
   c. means for effectively isolating said monitor circuit from said telephone circuit so said monitor circuit does not interfere with use of said telephone circuit;
   d. means for energizing said monitor circuit by a small portion of an ac ringing signal in said telephone circuit;
   e. said monitor circuit being arranged for interrupting ringing of said telephone circuit by briefly interacting with said telephone circuit to electrically simulate answering said telephone circuit; and
   f. said interrupting of said ringing of said telephone circuit being arranged to occur after a ringing interval as a function of the state of said switch when said telephone circuit is rung so that the number of rings before interruption conveys information about said monitored condition.

2. The monitor system of claim 1 wherein said monitor circuit includes means for interrupting ringing of said telephone circuit after different ringing intervals as a function of different states of said switch in response to differences in said monitored condition.

3. The monitor system of claim 2 wherein the shortest ringing interval indicates operation of said telephone circuit and said monitor circuit with said switch in a state that corresponds to normal circumstances for said monitored condition.

4. The monitor system of claim 3 wherein said switch state for said normal circumstances is closed.

5. The monitor system of claim 3 wherein said monitor circuit includes a switch arranged for manual operation to prevent said ringing interruptions when said telephone circuit is personally attended.

6. The monitor system of claim 1 including a plurality of said switches responsive to different monitored conditions and arranged to interrupt said ringing of said telephone circuit after different respective ringing intervals as a function of the states of said switches.

7. The monitor system of claim 6 wherein the shortest ringing interval indicates operation of said telephone circuit and said monitor circuit with said switches in states that correspond to normal circumstances for said monitored conditions.

8. The monitor system of claim 7 wherein said switch states for said normal circumstances are closed.

9. The monitor system of claim 7 wherein said monitor circuit includes a switch arranged for manual operation to prevent said ringing interruptions when said telephone circuit is personally attended.

* * * * *